(No Model.) 3 Sheets—Sheet 1.
B. M. SOULE.
VEHICLE SPRING.

No. 414,263. Patented Nov. 5, 1889.

Witnesses
Wm Musser
Edward Sleer

Inventor
Buren M. Soule.
By his Attorneys
A. G. Heylmun (No Model.) 3 Sheets—Sheet 2.

B. M. SOULE.
VEHICLE SPRING.

No. 414,263. Patented Nov. 5, 1889.

Witnesses
Wm Musser
Edward Stew

Inventor
Buren M. Soule.
By his Attorneys (No Model.) 3 Sheets—Sheet 3.

B. M. SOULE.
VEHICLE SPRING.

No. 414,263. Patented Nov. 5, 1889.

Witnesses

Inventor
Buren M. Soule.
By his Attorneys

UNITED STATES PATENT OFFICE.

BUREN M. SOULE, OF ENGLEWOOD, ILLINOIS, ASSIGNOR OF ONE-HALF TO WEDDLE & CO.

VEHICLE-SPRING.

SPECIFICATION forming part of Letters Patent No. 414,263, dated November 5, 1889.

Application filed May 8, 1889. Serial No. 309,984. (No model.)

*To all whom it may concern:*

Be it known that I, BUREN M. SOULE, a citizen of the United States of America, residing at Englewood, in the county of Cook and State of Illinois, have invented certain new and useful Improvements in Carriages and Wagons, of which the following is a specification.

My invention has relation to improvements in springs and body-supports for road-vehicles, and specially to improvements on that certain invention shown and described in Letters Patent No. 400,134, dated March 26, 1889, granted to me, wherein the body of the vehicle is sustained by parallel supporting-bars looped together and given a resilient function by springs engaging the supporting-bars.

The object of the present invention is to improve and perfect the construction and mechanical arrangement of the parts and combinations of my said former patented device, as will be fully specified hereinafter.

I have fully and clearly illustrated my invention in the accompanying drawings, wherein—

Figure 1:
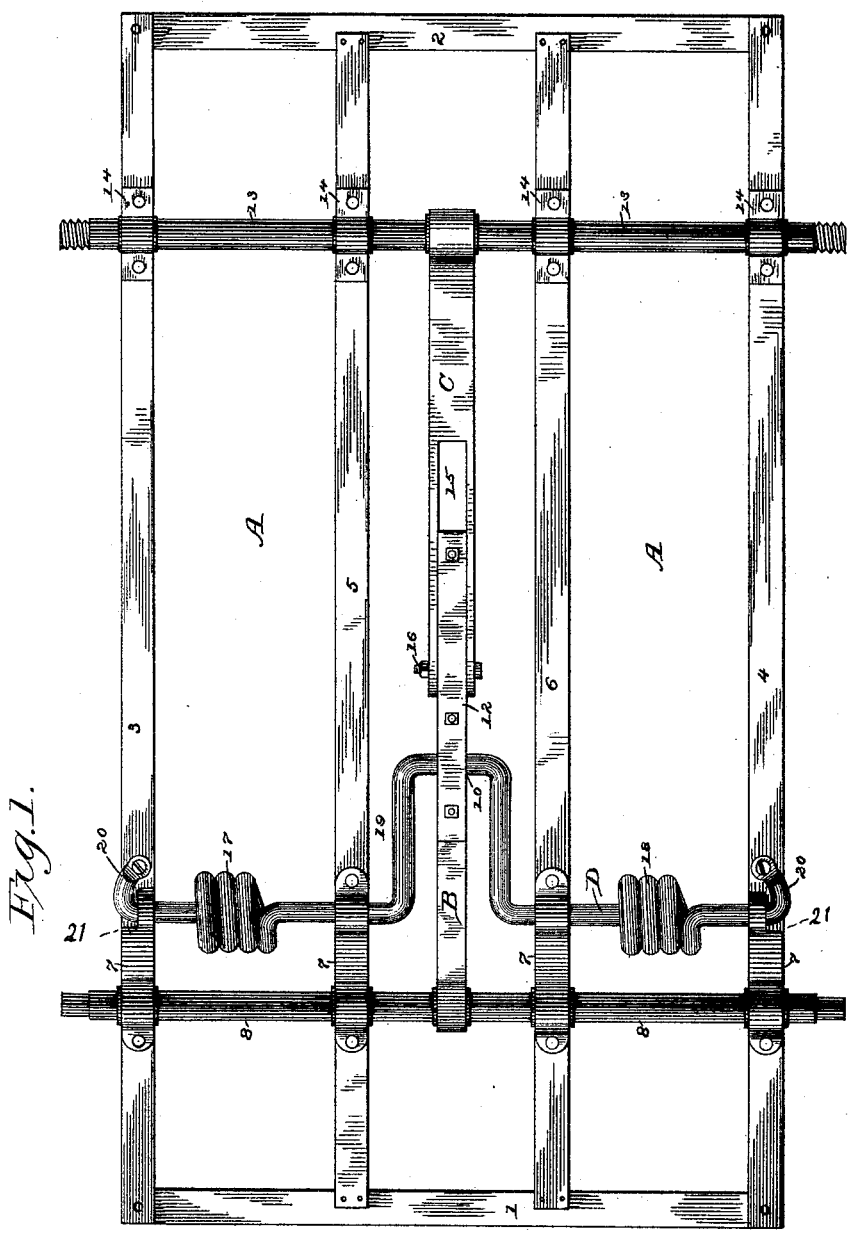
Figure 2:
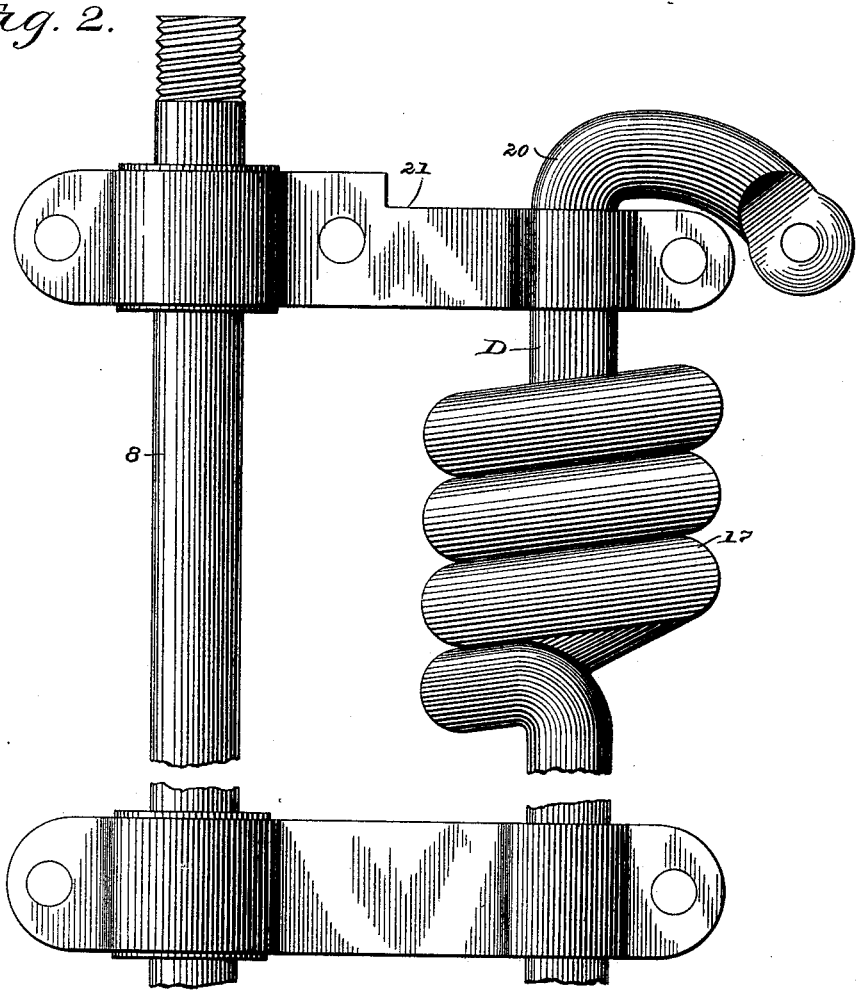
Figure 3:
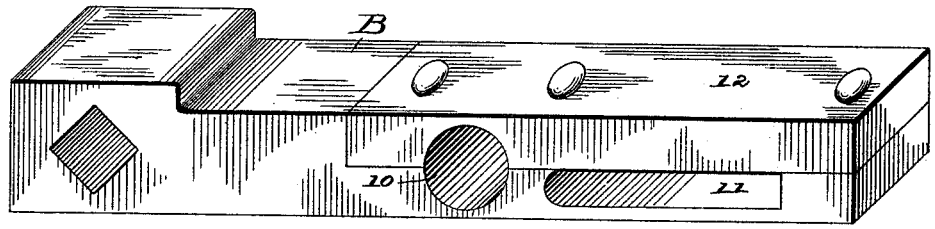
Figure 4:
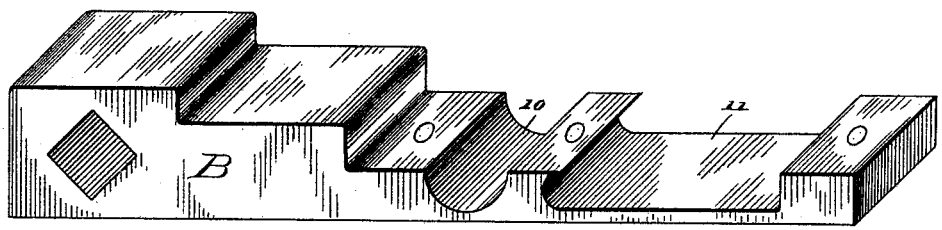
Figure 5:
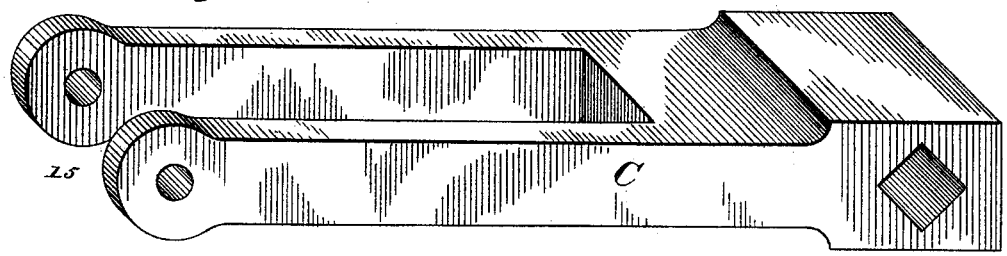
Figure 6:
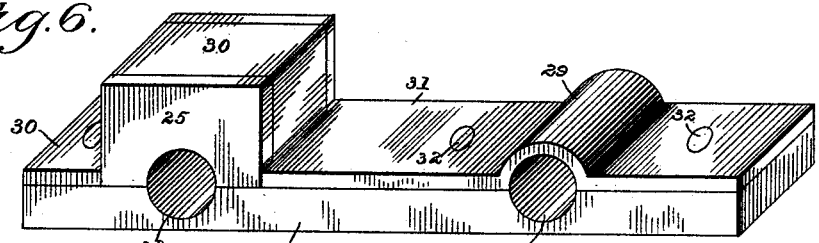
Figure 7:
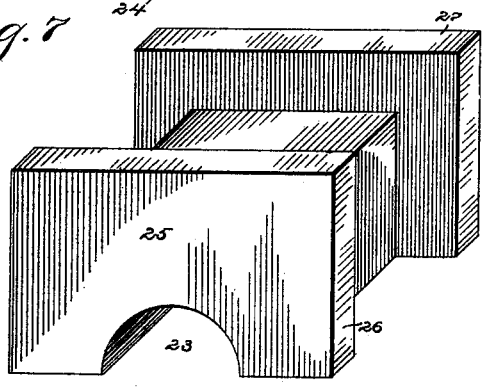
Figure 8:
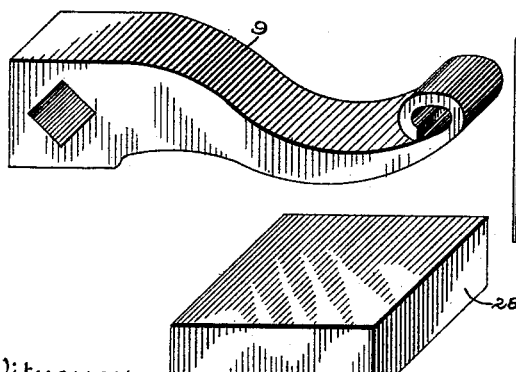

Figure 1 is a bottom plan view showing my improvement attached to the bottom of the body of a vehicle. Fig. 2 is an enlarged view, in detail, of a portion of the shaft and one side of the springs arranged in bearings. Fig. 3 is a perspective of one of the lever-arms with the cap-plate secured thereon. Fig. 4 is a similar view with the cap-plate removed. Fig. 5 is a perspective of the other lever-arm. Fig. 6 is a view of the bearing-box containing the anti-rattler arranged in operative connection. Fig. 7 is a detail view of the box for the anti-rattler block, the elastic cushion being removed and shown at the side of the box. Fig. 8 is a view of an arm by which the shafts may be attached to the bolsters or side bars of the vehicle.

A designates the bottom of the body of the vehicle, sustained by or mounted on a substantial frame composed of end pieces 1 2, side pieces 3 4, and intermediate bars 5 6, having their ends mortised in the end pieces, so as to bring their faces on the level with the faces of the side pieces. On each of the side pieces and intermediate bars are arranged and secured bearing plates or boxes 7, in which is mounted a shaft 8, the ends of which are shown extended beyond the sides of the body and formed to receive a supporting-arm 9, (see Fig. 8,) the other end of which may be shackled or hinged to the side bars or to the bolsters, as may be desired.

I have illustrated the shaft 8 as made of a square bar having journaled seats formed in it to set in the boxes supporting it; but, the object being to adapt the central part of the bar to hold in fixed relation the lever-arm attached thereto, any other construction suited to the purpose may be adopted. On the shaft 8 is rigidly fixed a lever-arm B, extended to substantially the middle of the vehicle-body. The lever-arm is formed with a seat 10, to take the bail of the spring, and at its free end is chambered out, as at 11, and on the side where the seat and chamber opens a cap-plate 12 is secured, substantially as shown in the drawings in Fig. 3.

Across the body of the vehicle, opposite from the shaft 8, is secured a similar shaft 13, held in place by boxes 14, as shown. On the shaft 13 is rigidly mounted a lever-arm C, extending in the direction of the center of the body and having its free end formed with an open-end slot 15, which receives the projecting end of the lever B, and is held in sliding connection therewith by a bolt 16, projected through the sides of the slotted portion and passed through the chamber 11. This construction and arrangement of the levers gives them a sliding function at the union where the shafts are turned on their bearings, and, although no spring be used, or the spring used becoming broken, the body cannot drop beyond the movement allowed by the connections which sustain the body on the other parts of the running-gear. The lever B may be formed of a single bar or piece and have the slot or chamber made therein, instead of covered by a plate; but the construction heretofore described is preferred, since the wear and tear may be remedied by a new plate and dressing.

D designates the spring. This consists of a substantial steel rod formed with coils 17 18, between which the rod is formed into a bail 19, the rod from the other end of each of the coils being extended straight and constituting a journal-rod, the extreme ends being curved around and properly secured, as at 20. This part 20 may be either fixed to the body of the vehicle or otherwise secured to support the parts. As shown in the drawings, the sides of the bearing-box caps are cut away, as at 21, in order to have the arm project but slightly at the side or curve. This spring is mounted in bearings which are extensions of and part of the same that sustains the shaft 8. The cap-plate 12 serves as a keeper for the bail of the spring.

As there is considerable strain and jar on the shaft and bearings at the outer parts, under ordinary wear and tear they may become worn, loose, and rattling. To prevent this, I have made them anti-rattling by means of a bearing-box of particular construction. I form a bearing 22 with a journal-seat 23 for the shaft and a seat 24 for the bar of the spring. To this is fitted a bearing-box 25, having a seat for the shaft and flanges extending beyond the end of the box and above it, as at 26 27. The top of the box is placed far enough below the edges of the top flanges to form a bed for an elastic cushion 28, which is laid thereon. A cap-plate is then provided, formed with a part 29 to fit over the bar of the spring, a cap part 30 to fit over the box and cushion between the flanges, and an end flange 31 to set on the end of the bearings 22. This cap-plate is secured in place by screws, rivets, or bolts 32, as shown. The elasticity of the interposed cushion keeps the box always adjusted on the shaft, and should it become loose a washer may be placed over it; or it may be removed and a new one put in its place.

It will readily be perceived that the arrangement of the levers and springs adapts them to be used attached to the side bars or to the bolsters of the vehicle, and they will be equally serviceable whether the connections be transversely with the body or longitudinally.

The advantages attained by my present invention are:

First. A direct vertical resiliency is given to the body of the vehicle.

Second. The resiliency of the spring is maintained and insured, because it cannot go down beyond the natural capacity, being limited by the connected levers; hence it cannot be injured by accident or overweight. The support of the body is independent and normally supported by the shaft and lever.

Having thus described my invention, what I claim is—

1. The combination of the shaft 8, mounted in bearings on the bottom of the body of the vehicle, the shaft 13, similarly mounted, the lever-arm B, rigidly fixed on the shaft 13 and provided with an open-end slot at the free end to take the end of the opposite lever-arm, and a bolt across the open end of the slot, and the lever-arm B, formed with a slot in its free end to engage the bolt of the opposite lever-arm, substantially as described.

2. The combination of the shaft 8, mounted in bearings on the bottom of the body of the vehicle, the lower arm B, rigidly fixed and projected from said shaft and formed with a spring-seat and a chamber at its outer or free end, a spring mounted on the bottom of the body of the vehicle and formed with a bail to set in the spring-seat of the lever-arm, the shaft 13, mounted on the bottom of the body of the vehicle, the lever-arm C, rigidly fixed thereto and formed with bifurcated end to take the opposite end of the other lever-arm, the ends of said bifurcations being connected by a bolt, and a cap-plate secured on the lever-arm over the spring and said bolt, substantially as described, and for the purpose specified.

3. The combination, with the two parallelly-arranged shafts and the lever-arm rigidly attached thereto and arranged with their inner and free ends to slide one within the other, one of said lever-arms being formed with a seat for the bail of the spring, of a torsion-spring mounted on the body and formed with a bail to set in the spring-seat of the lever-arms, and a cap-plate secured to the lever-arm over the bail of the spring, substantially as described.

4. The combination, with a shaft secured to the bottom of the body of a road-vehicle, of the anti-rattling bearing-box herein described, consisting of a bottom plate having a journal-seat formed therein, a loose box to fit over the journal and formed with flanges at its ends and top, an elastic cushion to set on the top of the loose box, and a cap to fit over the loose box and elastic cushion and between the flanges, substantially as specified.

In witness whereof I have hereunto set my hand in the presence of two attesting witnesses.

BUREN M. SOULE.

Witnesses:
JOHN FINDLAY,
GEO. R. S. MURPHY.